Oct. 19, 1965 — C. RINGOT — 3,212,988
FUEL ELEMENT FOR NUCLEAR REACTORS
Filed July 10, 1962
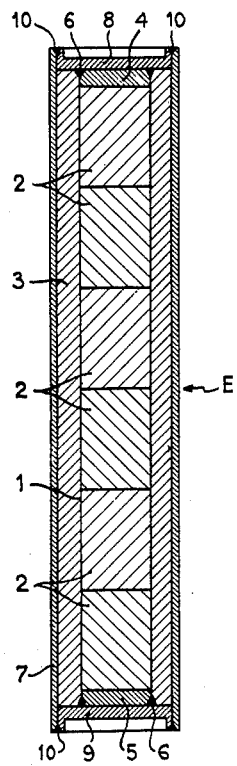
INVENTOR
CLAUDE RINGOT
BY Bacon & Thomas
ATTORNEYS

3,212,988
FUEL ELEMENT FOR NUCLEAR REACTORS
Claude Ringot, Chateau du Val Fleury, Gif-sur-Yvette,
Seine-et-Oise, France
Filed July 10, 1962, Ser. No. 208,736
Claims priority, application France, July 18, 1961,
868,283
7 Claims. (Cl. 176—67)

The present invention relates in general to fuel elements for nuclear reactors and more particularly to fuel elements of this character which are intended for use in nuclear reactors of the type cooled by gaseous circulation and operated at relatively high temperatures.

In many cases corrosion problems limit the use of materials otherwise very valuable from the neutronic point of view in reactors of this type, and sometimes interactions of metallurgical or mechanical character between the nuclear fuel and the sheath surrounding same prevent the use of materials having interesting corrosion-resisting properites.

It is the object of this invention to provide a fuel element for nuclear reactors, notably for high-temperature atomic piles fed with a gaseous medium, this element being remarkable notably in that it comprises a combustible substance, an inner sheath surrounding said combustible substance and consisting of a material having mechanical and neutronic properties consistent with said substance, and an outer sheath surrounding said inner sheath and made from a material adapted to resist corrosion by the medium surrounding said element.

An inner sheath material is considered as being compatible with the fuel substance when neutrons are capable of flowing unobstructed through the former while imparting to the inner sheath made from said material a creep resistance enabling said inner sheath, during the operation of the nuclear reactor, to accommodate the shape of the fuel located therein without producing any metallic reactions between the fuel substance and the material constituting said inner sheath at the high temperature developing during this operation. Due to its low rate of neutronic absorption the inner sheath may be relatively thick, for instance in the range of about .04" to 0.8", although this thickness may be varied as a function of the type of fuel and of the material constituting the inner sheath.

Materials having a low rate of neutronic absorption which are suitable for contacting the fuel substance are for example zirconium, aluminium, beryllium, etc.

Zirconium is not compatible with carbon dioxide gas, the conventional cooling fluid of gas-cooled atomic piles, at temperatures of the order of 660° F. (350° C.); however, a fuel element comprising uranium oxide as a fuel substance and a zirconium sheath displays a satisfactory sheath resistance at high temperatures of the order of 1,110° F. (600° C.), provided that it is isolated from the carbon dioxide gas. Now this isolating effect is obtained through the outer sheath.

This outer sheath should be capable of resisting to corrosion by the cooling fluid ($CO_2$, methane, etc.) circulating about the fuel element, in spite of the very high operating temperatures of the reactor.

Materials particularly suitable for making this outer sheath are 18/8 austenitic stainless steel, molybdenum refractory steels and 80/20 nickel-chromium refractory alloy. These alloys are definitely compatible with carbon dioxide gas at temperatures of the order of 1,110° F. (600° C.) and therefore they are suitable for making the outer sheath of the fuel element. Furthermore, they have a good mechanical strength, notably under pressure. However, these alloys were unsuitable for making single-sheath fuel elements, for example with uranium oxide, due to mechanical reactions developing between this oxide and the sheath during the operation. Moreover, their neutronic absorption is such that only very thin layers of these alloys can be used.

With the present invention it is possible to use these alloys for making the outer sheath since the inner sheath isolates them from the fuel. Thus, they can be used in thin layers of the order of .004" or less. Very satisfactory results are obtained with thicknesses of this order.

The single figure of the attached drawing illustrates diagrammatically by way of example in longitudinal section a double-sheath fuel element constructed according to the teachings of this invention.

This element E comprises an inner space 1 containing the fuel substance for example uranium oxide tablets 2. This space 1 is bound by a cylindrical sheath 3 surrounding the fuel substance and by a pair of end discs or plates 4, 5 welded on the cylindrical sheath 3 at the ends thereof as shown at 6 in the figure.

These discs 4, 5 are slightly sunk into the cylindrical cavity formed by the sheath 3 so that their outer faces are flush with the ends of the cylindrical portion 3. The weld seam is formed along the outer edges of the discs, as shown. Thus, the substance 2 is surrounded completely by the sheath 3 and the end discs 4, 5.

The sheath 3 and discs 4, 5 are made from a material compatible with the fuel enclosed therein; thus, zirconium constitutes a convenient material, the sheath thickness ranging for example from about .04" to .08", but as already set forth hereinabove this thickness may be changed as required by the properties of the fuel substance used in the element, and also according to the type of material constituting the sheath and to other factors likely to become more or less critical in the construction of the element and in the specific use for which it is intended.

The sheath 3 is wrapped in turn in another sheath or outer sheath also consisting of a cylindrical casing 7 having its ends closed by a pair of cup-shaped capsules or covers 8, 9 superposed on the discs 4,5; these capsules are welded on the ends of sheath 7 by weld seams 10 disposed like the weld seams 6. The outer sheath surrounds completely, and is substantially thinner than, the inner sheath, its thickness being generally of about .004". A material suitable for making this outer sheath is for example a corrosion-resisting material such as 18/8 stainless steel or 80/20 refractory alloy. Thus, a compact element E is obtained which, due to the provision of the outer sheath 7, affords a satisfactory resistance to corrosion by the cooling fluid circulating about the element, the inner sheath 3 preventing any metallurgical or mechanical reaction between the fuel and the outer sheath while imparting to the assembly a good resistance to operating temperatures.

A 18/8 $UO_2$-zirconium-steel element has been described hereinabove. However, these different component elements may be modified to suit specific requirements. Thus, a few possible combinations in the case of an atomic pile cooled with $CO_2$ are given in the following table by way of example.

Table

| Fuel | Inner sheath | Outer sheath |
|---|---|---|
| UO₂ | Zr (thickness .04 to .08″) | 18/8 steel. |
| UO₂ | Be (thickness about .04″) | 18/8 steel (thickness about .004″). |
| UO₂ | ___do___ | 80/20 refractory alloy (thickness about .004″). |
| UC | Al (thickness about .04″) | 18/8 steel (thickness about .004″). |
| UC | ___do___ | 80/20 refractory alloy (thickness about .004″). |
| UC | Be (thickness about .04″) | 18/8 steel (thickness about .004″). |
| UC | ___do___ | 80/20 refractory alloy (thickness about .004″). |

Of course, the invention should not be construed as being limited to the specific form of embodiment shown and described herein, which is given by way of example only. This invention is applicable notably to any fuel element of which the operating temperature is limited by the sheath, not by the fuel. As this limitation is closely related to the cooling fluid corrosion factor, many forms of embodiment may be contemplated according to the type of cooling fluid utilized, without however departing from the spirit and scope of the invention as set forth in the appended claims.

I claim:

1. A fuel element for nuclear reactors cooled by gaseous circulation and operated at relatively high temperatures comprising a fuel substance selected from the group consisting of uranium dioxide and uranium carbide covered by a first sheath of material having a low neutronic absorption capacity, good creep resistance, mechanical and metallurgical properties compatible with said fuel substance and being selected from the group consisting of zirconium, aluminum and beryllium and an outer sheath surrounding said inner sheath being formed from a material resistant to corrosion by the gaseous coolant which surrounds said element and which is selected from the group consisting of austenitic stainless steel, molybdenum refractory steel and nickel chrome refractory alloys, said first sheath being of a thickness of 0.04 to 0.08 inch and said second sheath of a thickness not more than 0.004 inch.

2. Fuel element according to claim 1, wherein the fuel substance is uranium dioxide.

3. Fuel element according to claim 1, wherein the fuel substance is uranium carbide.

4. A fuel element as claimed in claim 1 wherein the outer sheath material is 18/8 stainless steel.

5. A fuel element as claimed in claim 4 wherein the fuel substance is uranium dioxide tablets bound by a first cylindrical sheath of zirconium and by a pair of end discs of zirconium welded onto the zirconium sheath at the ends thereof, said outer sheath comprising a cylindrical sheath of 18/8 stainless steel and end enclosures of the same material superposed on the zirconium end discs and welded on the ends of the outer steel sheath.

6. A fuel element as claimed in claim 1 wherein the outer sheath material is 80/20 nickel-chrome refractory alloy.

7. A fuel element for nuclear reactors cooled by gaseous circulation and operated at relatively high temperatures comprising a fuel substance selected from the group consisting of uranium dioxide and uranium carbide bounded by a cylindrical 0.04 to 0.08 inch thick first sheath of material selected from the group consisting of zirconium, aluminum and beryllium and by a pair of discs of the same material as said first sheath integrally attached to the ends of said sheath so as to be flush therewith and said first sheath being in turn, enclosed in an outer cylindrical not more than 0.004 inch thick sheath of a material selected from the group consisting of austenitic stainless steel, molybdenum refractory steel and nickel chrome refractory alloy and by a pair of cupped-shaped covers of the same material as said second sheath welded to the ends of said outer sheath.

References Cited by the Examiner

UNITED STATES PATENTS

| | | | |
|---|---|---|---|
| 2,863,816 | 12/58 | Stacy | 176—70 |
| 2,872,401 | 2/59 | Wigner et al. | 176—82 |
| 2,927,071 | 3/60 | Huey | 176—79 |
| 2,969,309 | 1/61 | Finniston et al. | 176—82 |
| 2,990,351 | 6/61 | Sanz et al. | 176—71 |
| 2,990,352 | 6/61 | Finniston et al. | 176—82 |
| 3,018,238 | 1/62 | Layer et al. | 29—470.1 |
| 3,039,944 | 6/62 | Zumwalt | 176—68 |
| 3,085,059 | 4/63 | Burnham | 176—73 |

FOREIGN PATENTS

| | | |
|---|---|---|
| 790,334 | 2/58 | Great Britain. |
| 853,302 | 11/60 | Great Britain. |
| 859,940 | 1/61 | Great Britain. |

OTHER REFERENCES

Metallurgy & Fuels, by Finniston et al., Series V, October 1957, p. 487.

CARL D. QUARFORTH, *Primary Examiner.*

OSCAR R. VERTIZ, *Examiner.*